(12) United States Patent
Krahn

(10) Patent No.: US 8,015,762 B2
(45) Date of Patent: Sep. 13, 2011

(54) WINDOW ELEMENT FOR INSERTING IN A STRUCTURAL PART AND METHOD OF INTEGRATION OF A WINDOW ELEMENT IN A STRUCTURAL PART

(75) Inventor: Stefan Krahn, Osnabrueck (DE)

(73) Assignee: Airbus Operations GmbH, Hamburg (DE)

(*) Notice: Subject to any disclaimer, the term of this patent is extended or adjusted under 35 U.S.C. 154(b) by 223 days.

(21) Appl. No.: 12/515,244

(22) PCT Filed: Nov. 15, 2007

(86) PCT No.: PCT/EP2007/009897
§ 371 (c)(1),
(2), (4) Date: May 15, 2009

(87) PCT Pub. No.: WO2008/058746
PCT Pub. Date: May 22, 2008

(65) Prior Publication Data
US 2010/0043300 A1   Feb. 25, 2010

(30) Foreign Application Priority Data
Nov. 16, 2006  (DE) .......................... 10 2006 053 967

(51) Int. Cl.
*E06B 7/00* (2006.01)
*B64C 1/14* (2006.01)
*B05D 1/32* (2006.01)

(52) U.S. Cl. .................. 52/204.597; 52/208; 244/129.3; 427/282

(58) Field of Classification Search .................. 52/208, 52/204.597, 204.591; 244/129.3; 296/201, 296/84.1, 96.21, 146.15; 427/162, 163.1, 427/164, 165, 272, 282, 287
See application file for complete search history.

(56) References Cited

U.S. PATENT DOCUMENTS

| | | | | |
|---|---|---|---|---|
| 2,257,035 A * | 9/1941 | Chaffee | ......................... | 52/208 |
| 2,989,787 A * | 6/1961 | Smith | ............................. | 52/202 |
| 3,503,168 A * | 3/1970 | Eggert, Jr. | ...................... | 52/208 |
| 3,743,150 A * | 7/1973 | Eckart, Jr. | ......................... | 225/9 |
| 3,863,601 A * | 2/1975 | Eckart, Jr. | ..................... | 118/505 |
| 4,793,108 A * | 12/1988 | Bain et al. | ..................... | 52/208 |
| 4,803,820 A * | 2/1989 | Metrick | ................... | 52/204.591 |
| 4,825,609 A * | 5/1989 | Rundo | ............................ | 52/202 |

(Continued)

FOREIGN PATENT DOCUMENTS

DE  10 2005 058749   2/2007

(Continued)

OTHER PUBLICATIONS

Office Action dated Dec. 9, 2010 conducted in counterpart Chinese Application No. 200780042659.1 (with English language translation).

*Primary Examiner* — Robert J Canfield
*Assistant Examiner* — Brent W Herring
(74) *Attorney, Agent, or Firm* — Greenblum and Bernstein P.L.C.

(57) ABSTRACT

Window element (1, 23) with a covering tape (7, 36) and a covering means (8, 35) and comprising a window assembly (5, 25) which can be fixed in a hermetically sealed manner to the window frame (4, 24) by means of a retainer (15, 26), the window frame (4, 24) being enclosed by an encircling seal (11, 32) which has an encircling recess (12, 33).

17 Claims, 3 Drawing Sheets

U.S. PATENT DOCUMENTS

| | | | | |
|---|---|---|---|---|
| 5,271,581 | A | * | 12/1993 | Irish .......................... 244/129.3 |
| 5,405,651 | A | * | 4/1995 | Western ........................ 427/272 |
| 5,441,769 | A | * | 8/1995 | Ross et al. .................... 427/282 |
| 5,462,243 | A | | 10/1995 | Hart et al. |
| 5,773,110 | A | * | 6/1998 | Shields ........................ 428/40.1 |
| 5,887,393 | A | * | 3/1999 | Vanark et al. .................... 52/208 |
| 6,168,112 | B1 | * | 1/2001 | Mueller et al. ............. 244/129.3 |
| 6,444,307 | B1 | * | 9/2002 | Tuoriniemi ................... 428/343 |
| 6,814,385 | B2 | * | 11/2004 | Fujiwara .......................... 296/93 |
| 2006/0123718 | A1 | * | 6/2006 | Paspirgilis ................... 52/204.1 |
| 2008/0067288 | A1 | * | 3/2008 | Eberth et al. ............... 244/129.3 |
| 2008/0308677 | A1 | * | 12/2008 | Kirchoff et al. ............ 244/129.3 |

FOREIGN PATENT DOCUMENTS

| | | |
|---|---|---|
| EP | 0 936 138 | 8/1999 |
| WO | WO 9202307 A1 * | 2/1992 |

* cited by examiner

WINDOW ELEMENT FOR INSERTING IN A STRUCTURAL PART AND METHOD OF INTEGRATION OF A WINDOW ELEMENT IN A STRUCTURAL PART

CROSS-REFERENCE TO RELATED APPLICATIONS

The present application is a U.S. National Stage of International Patent Application No. PCT/EP2007/009897 filed Nov. 15, 2007 and claims priority under 35 U.S.C. §119 of German Patent Application No. 10 2006 053 967.2 filed Nov. 16, 2006. Moreover, the disclosure of International Patent Application No. PCT/EP2007/009897 is expressly incorporated by reference herein in its entirety.

BACKGROUND OF THE INVENTION

1. Field of the Invention

The invention relates to a window element for inserting in a window cutout in an aircraft skin, the window element being prepared by masking for painting. The invention further relates to a method of integration of a window in a structural part.

2. Discussion of Background Information

After installation in the window openings in an aircraft fuselage, known window elements are generally painted in the color of the aircraft. For this purpose, the window frame and/or the window surface have to be masked in a complicated manner with films and/or adhesive tapes in order to avoid undesirable soiling of the window surfaces during the painting process. Use is made in this connection of adhesive tapes and/or adhesive films which, after the painting process is ended, can be removed from the masked surfaces of the fuselage without leaving a residue. In addition, the adhesive tapes/adhesive films may be disturbed during the preparatory sanding of the surfaces to be painted, and therefore, under some circumstances, further finishing work, for example in the form of re-adhering masking elements or re-drawing contours using cutter blades arises. For masking, use may also be made of templates, but these likewise have to be fitted individually onto each window element and oriented in order to achieve the desired covering effect in the edge regions too. In the case of passenger aircraft with usually several 100 window elements, the preparatory work for the painting operation proves highly labor-intensive.

SUMMARY OF THE INVENTION

According to the invention, a window element is provided that is advantageous with regard to painting measures on the aircraft structure. Further, the invention provides a method of integrating a window in a structure part, and particularly in an aircraft structure, which reduces the painting effort.

Accordingly, the invention includes a window element for fastening in a window cutout in a structural part, where the window element is masked for painting. The window element includes a window frame, which can be connected to the structural part, a window assembly with an inner pane, an outer pane and an encircling seal profile. The sealing profile has an outer inclined surface for self-centering in the window frame, and the window assembly is accommodated between the retainer and the window frame. At least in some regions, the outer inclined surface of the sealing profile abuts an inner inclined surface of the window frame, and the outer inclined surface and the inner inclined surface are designed so that these surfaces provide self-centering of the window assembly in the window frame. Fastening elements are provided for clamping the window assembly on the window frame, a covering layer at least partly covers the outer pane, and an encircling covering tape having a first section covering a border area of the covering element and a second section positioned between the outer inclined surface of the seal profile and the inner inclined surface of the window frame. The invention is also directed to a method of integrating a window in an structural part that includes inserting a window element, as described above, in an opening of a structural part, painting of at least a part of the structural part, removing the covering tape and the covering layer Further embodiments are described in the subclaims.

Particularly, according to the invention, a window frame is provided that can be connected to the skin or a structure part A window assembly includes an inner pane and an outer pane enclosed by an encircling seal. The seal has an encircling recess for self-centering in the window frame, and a retainer which can be fixed to the window frame by fastening elements. The window assembly is accommodated between the retainer and a bearing surface of the window frame, and the recess, at least in some regions, bears against a window frame inner edge. A covering element either covers the outer pane with an edge region being left free, or completely covers it, and an encircling covering tape has a first section that covers the covering element and a second section that runs between the recess and the window frame inner edge.

According to the invention, after fitting into an aircraft fuselage, the window element can be immediately painted over. Additional preparatory measures, such as, for example, masking the window element, are dispensed with entirely. After the painting process is finished, first of all the covering, which preferably completely covers the window assembly to the outside, is pulled off. The encircling covering tape can then be pulled out from the gap between the recess of the window assembly seal and the window frame inner edge.

In order to obtain a firm fit and therefore a good masking effect, the covering tape runs with its first section in the edge region of the outer pane while a second section, which encloses an angle of approximately 90° with the first section, runs at least in some regions between an encircling recess of the window assembly seal and a window frame inner edge.

The covering is preferably formed by a self-adhesive thermoplastic film which can be detached from an underlying surface without leaving a residue. The covering tape is also formed by a tape-shaped, self-adhesive thermoplastic film which can be detached or pulled off without leaving a residue, with neither the covering nor the covering tape having any fiber reinforcement. The covering may cover the outer pane completely or with an edge region being left free.

In order, in particular, to ensure that the covering tape is pulled out without leaving a residue, the thermoplastic material used for producing the covering tape has to have a sufficient mechanical shearing strength. At the same time, the covering tape has to be sufficiently flexible so that the covering tape can be applied in as crease-free a manner as possible in the region of the essentially oval outer contour of the window assembly.

An advantageous refinement of the window element provides that the first section and the second section of the covering tape enclose an angle of approximately 90°.

As a result of the "bevelling" of the covering tape or of the masking tape, a particularly tightly fitting masking of the window element is achieved, and therefore neither paint nor spray mist can reach surfaces of the window element that are not to be painted.

According to a further advantageous refinement, it is provided that the covering overlaps the covering tape at least in some regions in the edge region of the outer pane of the window element.

Owing to the fact that the extensive covering constitutes the continuation of the covering tape, the overlapping ensures a gap-free transition between the covering tape and the covering. In this case, the covering tape preferably rests on the edge of the covering. A reverse sequence between the covering and the covering tape is likewise conceivable.

Further advantageous refinements of the arrangement are depicted in the further patent claims.

DETAILED DESCRIPTION OF THE PRESENT INVENTION

Figure 1:
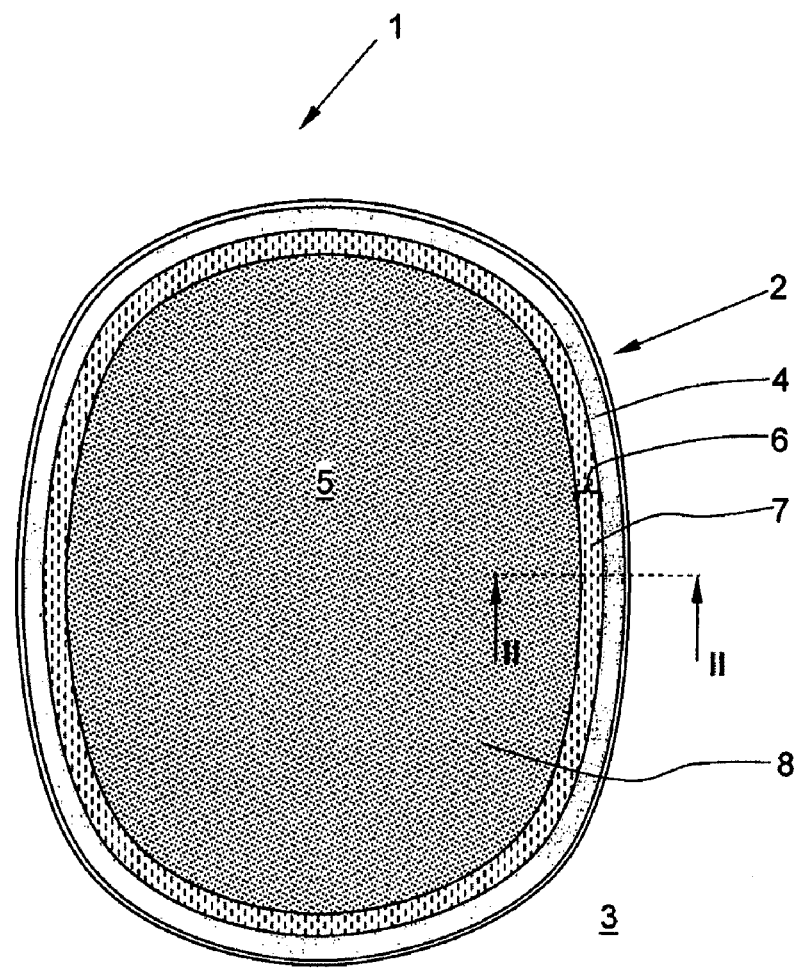
FIG. 1 shows a plan view of a window element according to the invention from the outside.
Figure 2:
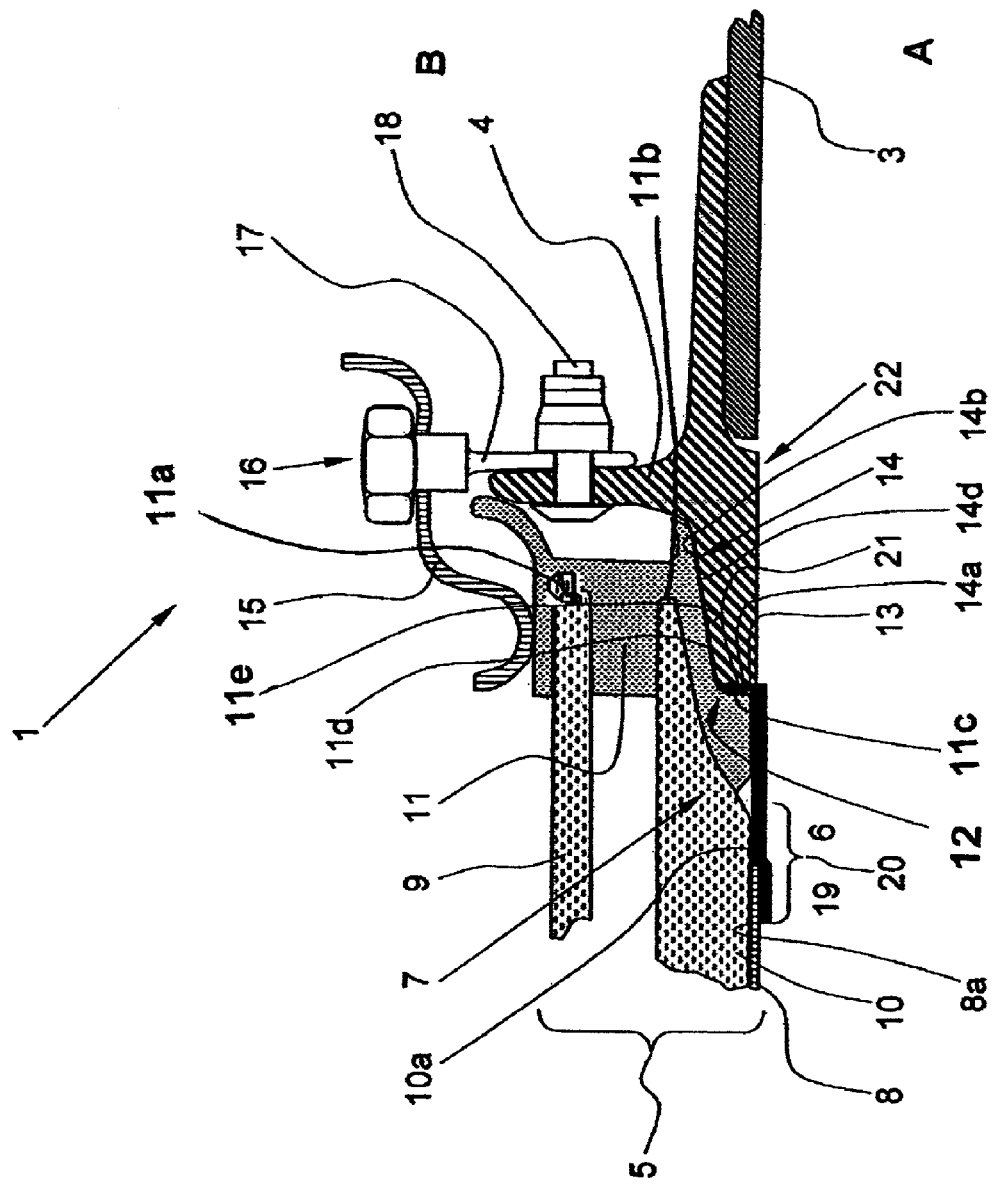
FIG. 2 shows a cross-sectional illustration along the section line II-II through the window element, and FIG. 3 show a cross-sectional illustration through a variant embodiment of the window element.

FIG. 1 shows a plan view of a window element or window package or window module 1 according to the invention from the outside. In FIG. 2, for orientation an outer side A and an inner side B are defined with regard to the window when inserted in a structure part. Further, with regard to the cross-section of the profile of the window frame and of the sealing profile according to the invention, a first side I, a second side II and a first direction D1 running from the second side II to the first side I is defined.

The window element 1 is fastened in a window cutout 2 in a structural part 3, e.g., the fuselage, of an aircraft. The window element 1 comprises a window frame 4 into which a window assembly 5 with an inner pane 9, 30, an outer pane 10, 31 and an encircling sealing profile 11, 32 are arranged. The inner pane 9, 30 and the outer pane 10, 31 are inserted in at least one cross-sectional recess of the sealing profile 11, 32. Particularly, two recesses 11a, 11b (FIG. 2) can be provided in the sealing profile 11 so that the inner pane 9 can be inserted in a first cross-sectional recess 11a and the outer pane 10 can be inserted in a second cross-sectional recess 11b. The outer pane 10, 31 is lying on the outer side A of the structure part 3 and the inner pane 9, 30 is lying on the inner side B of the structure part 3.

The sealing profile 11, 32 comprises an outer inclined surface 11d, 32b directed more or less to the outer side A. Further, the window frame 4, 24 comprises an inner inclined surface 14b, 29b directed more or less to the inner side B. Particularly, the window frame 4, 24 can comprise a shoulder or a cross-sectional part 14, 29 extending to the first side I and comprising the inner inclined surface 14b, 29b. The seal profile 11, 32 and the window frame 4, 24 are designed and positioned such that the outer inclined surface 11d, 32b of the seal profile 11, 32 is at least partially abutting the inner inclined surface 14b, 29b of the window frame. The outer inclined surface 11d, 32b and the inner inclined surface 14b, 29b are designed such that these surfaces provide self-centering of the window assembly 5, 25 in the window frame 4, 24. For this purpose, in the cross-sectional view of FIGS. 2 and 3, the inner inclined surface 14b, 29b is at least a part of the inner surface of the cross-sectional part 14, 29 extending to the first side I and the inner inclined surface 14b, 29b has a direction component directed to the first side I and also a direction component directed to the outer side A.

The self-centering inclined surfaces 11d, 29ba and 14b, 29b, respectively, can also be provided sectionally in the longitudinal direction (direction of line of sight onto the drawing plane) of the window frame 4, 24 and the sealing profile 11, 32, respectively.

An edge region 6 of the window assembly 5 that encircles around the contour of the window assembly 5 and has an essentially constant width is covered by an encircling covering tape 7 which is preferably designed as a pull-off tape which can be detached without leaving a residue. The surface of the window assembly 5 is covered by an a covering layer or covering skin 8, in particular in the form of a pull-off film which can be detached without leaving a residue. The covering layer 8, 35 can be formed as an extensive covering. The covering layer 8, 35 can be designed such and is placed on the outer pane 10, 31 such that a border area or an encircling area 10a, 31a of the surface of the outer pane 10, 31 is being left free.

Alternatively, the covering layer 8, 35 can be designed such and can be placed on the outer pane 10, 31 such that the covering layer 8, 35 completely covers the outer pane 10, 31. The covering tape 7 is preferably designed as a pull-off tape which can be detached without leaving a residue.

The border area or the encircling area 10a, 31a of the surface of the outer pane 10, 31 can run a distance in the first direction D1 from the outmost edge or an outer edge of the outer pane 10, 31.

Further, on the outer pane a part of a covering tape 7 is placed on the border area 6 of the surface of the outer pane 10, 31 and/or on the covering layer 8, 35. The covering tape can have a constant width in its longitudinal direction. Alternatively, the covering tape can have a width which changes along its longitudinal direction. The covering tape can cover a border area 10a, 30a completely encircling the outer edge of the outer pane which runs along the outer edge of the outer pane 10, 31 so that the covering tape encircles around the contour of the outer pane 10, 31. Alternatively, the covering tape can cover at least one section of the encircling border area 10a, 31a of the surface of the outer pane 10, 31.

Preferably, the covering layer 8, 35 and the covering tape 7 are placed such that the surface of the outer pane of the window element 1 which is seen from the outer side A is completely covered by the covering layer 8, 35 and the covering tape 7.

The covering tape 20, 37 can completely or partially encircle the outer pane. Preferably, the covering tape 7 partially covers or overlaps with a first section 20, 37 an edge region or a border area 8a of the covering 8.

A second section 21, 38 of the covering tape 20, 37 is positioned between the outer inclined surface 11d of the seal profile 11, 32 and the inner inclined surface 14b of the window frame 4, 24.

Both the encircling covering tape 7 and the covering or covering layer 8 are already applied to the window assembly 5 of the window element 1 in a process which can be separate from the painting process. After insertion of the window element 1 into the window cutout or opening 2 of the structural part 3, the window element 1 according to the invention can therefore be immediately painted over without further preparatory measures. After the painting process is ended, the covering layer 8 is first pulled off from the window assembly 5. The encircling covering tape 7 is then pulled out and the painting operation is finished.

FIG. 2 shows a cross-sectional illustration along the section line II-II. The window frame 4 is fastened in the window cutout or opening 2. The window frame 4 is fastened in the window cutout 2 of the structural part 3 by, for example, an encircling, two-row riveting or screwing operation or by adhesive bonding.

The window assembly 5 has an inner pane 9 and an outer pane 10 which, uniformly spaced apart from each other, are surrounded by an encircling seal 11. The seal or sealing profile 11 comprises the outer inclined surface 11d.

In one embodiment, the outer inclined surface 11b can be provided with an partially or completely encircling recess 12 or an rebate. The outer inclined surface 11d can also be formed of two surface sections, a front part 11c and a rear part 11e, cross-sectionally running angled with regard to each other and, particularly, which can form an approximately right-angled cross-sectional geometry. The inner surface 14b of the window frame 4, 24 can also be provided with a front part 14a and a rear part 14d, cross-sectionally running angled with regard to each other and, particularly, be formed such that the recess or rebate 12 form-fits with and bears against a window frame inner edge 13, as a result of which the window assembly 5 is centered in the window frame 4. In this embodiment, the rear parts 11e, 14d can particularly be bearing surfaces so that the encircling seal 11 of the window assembly 5 bears against a bearing surface 14d of the window frame 4, which bearing surface is preferably formed conically, i.e. slightly inclined towards the centre of the window cutout 2.

Also, the front parts 11c, 14a and the rear parts 11e, 14d can form an ellipsoid contour of the surfaces 11d, 14b.

The window assembly 5 is fixed from the inside to the window frame 4 by at least one fastening element 16, 27, optionally by an additional retainer 15. When using the retainer 15, the retainer 15 and the window frame 4 are fixed by the fastening element 16 which, in the exemplary embodiment shown in FIG. 2, is designed as an eye bolt 17 which is connected to the window frame 4 by a fastening bolt 18 which is guided through the window frame 4 horizontally, i.e. approximately parallel to the skin of the fuselage 3. The fixing between the retainer 15 and the window frame 4 preferably takes place by a total of at least four fastening elements which are distributed over the circumference of the window frame 4 approximately uniformly spaced apart from one another and which correspond in their construction to the fastening element 16.

The covering or covering layer 8 extends over the entire surface or a region of the surface of the outer pane 10. In one embodiment, the covering 8 leaves, in particular, an encircling edge region 6 free. The covering 8 may also completely cover the outer pane 10. The covering 8 is overlapped on the edge side by the covering tape 7 with an overlapping section 19 being formed so as to avoid any formation of a gap and a resultantly caused inadvertent penetration of paint. The covering tape 7 comprises a first cross-sectional section 20 which, in the overlapping region, runs on the covering 8 and also on the outer pane 10. A second cross-sectional section 21 of the covering tape 7 runs between the inclined surfaces.

An outmost part 11c, 32a of the outer inclined surface 11d, 32b and an outmost part 14a, 29a of the inner inclined surface 14b, 29b can extend in a direction which, in a cross-sectional view (FIGS. 2 and 3) is directed with an angle of 90±15° with regard to the outer surface of the outer pane 8, 35 or with regard to the opening 2. Preferably, the outmost part forms an angle of more than 90° with regard to a plane section of the rear part 11e, 32d of the inclined surface 11d, 32b and a plane section of the rear part 14d, 29d of the inner inclined surface 14b, 29b.

Preferably, the second cross-sectional section 21 of the covering tape 7 cross-sectionally extends only between the outmost part 11c, 32a of the outer inclined surface 11d, 32b and the outmost part 14a, 29a of the inner inclined surface 14b, 29b.

When a recess 12 is provided, the section 21 of the covering tape 7 can extend into a gap (not denoted specifically) between, if provided, the recess 12 in the seal 11 of the window assembly 5 and the window frame inner edge 13.

With the embodiment with the second section 21 of the covering tape 7 not running in the region between the bearing parts or rear parts 11e, 32d and, respectively, of the inclined surfaces 11d, 14b and the seal 11, trapping of the covering tape 7 during fixing of the window assembly 5 to the window frame 4 is avoided. Secondly, the penetration of paint or of spray mist is reliably avoided by the profile, which is angled approximately by 90° with respect to the first section 20 of the covering tape 7, of the second section 21 which projects into the recess 12 of the seal 11, and therefore only the fuselage skin 3 and a window frame outer side 22 are coated with the desired color.

The covering 8 is preferably formed by a self-adhesive, smooth plastic film which can be detached from the underlying surface without leaving a residue. Correspondingly, the covering tape 7 is formed by a plastic tape which can be detached from the underlying surface without leaving a residue. Both the plastic film and the plastic tape are formed by a thermoplastic material. In particular, the thermoplastic material used for the covering tape 7 has to have sufficient flexibility so that it can be placed into the recess 12 around the contour of the window assembly 5 in a manner free from creasing. In addition, the plastic material has to have sufficient mechanical tensile strength so that the covering tape 7 between the seal 11 and the window frame inner edge 13 can be pulled out without leaving a residue, i.e., in particular, in a manner free from torn or split pieces.

By the covering tape 7 and the covering 8, the outer pane 10 and the rubber seal 11 are completely covered by a continuous protective film covering during the painting operation. Accordingly, the window frame outer surface 22 of the window element 1 according to the invention and the aircraft skin 3 can be painted over immediately after fitting in the desired color without further measures protecting against an inadvertent or undefined application of paint in the region of the window element 1.

After the painting operation is finished, the covering tape 7 between the seal 11 and the window frame inner edge 13 is pulled out. The covering 8, i.e. the self-adhesive plastic film, is subsequently lifted from the outer pane 10 and detached and the window frame outer side 22 is completely painted over in the desired color.

Immediately after fitting in the window cutout 2 of an aircraft fuselage skin 3, the window element 1 according to the invention can be painted in the desired color of the aircraft fuselage. Complicated preliminary painting work, such as, for example, the time-consuming masking of all of the window elements 1, can be entirely dispensed with. In particular in the case of large passenger aircraft with frequently several hundred window elements, a considerable potential saving in respect of the painting preparation arises with the use of the window element 1 according to the invention.

Figure 3:
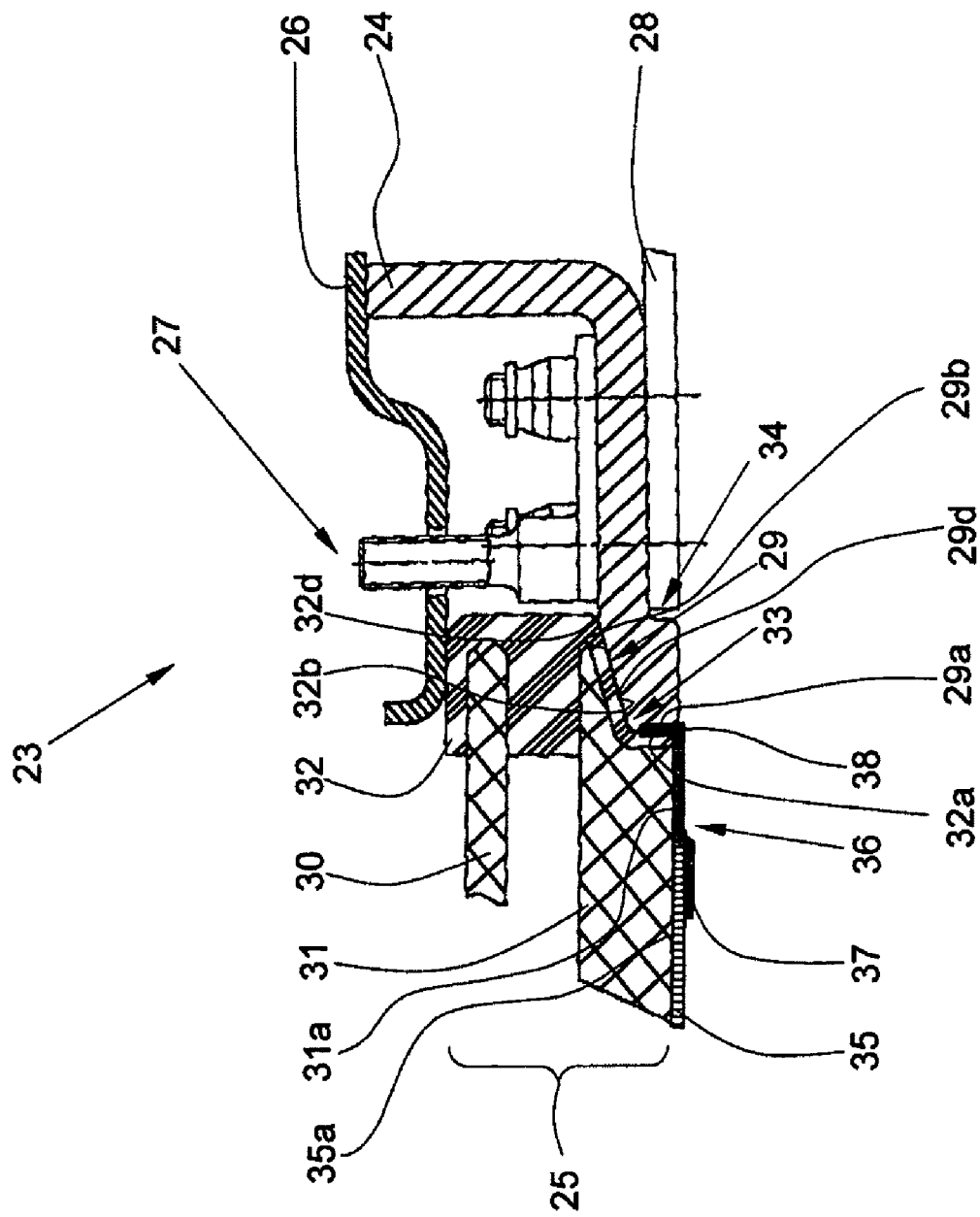

FIG. 3 shows a variant of the window element. In contrast to the illustration of FIG. 2, a window element 23 comprises a window frame 24 with an essentially L-shaped cross-sectional geometry. A window assembly 25 is fixed to the window frame 24 by a retainer 26. The fixing between the retainer 26 and the window frame 24 takes place by a fastening element 27. In this case, the entire window element 23 preferably comprises at least six fastening elements which are designed in accordance with the fastening element 27 and are distributed uniformly spaced apart from one another over the circumference of the window frame 24. The window frame 24 in turn is connected to the fuselage skin 28, in particular by a riveting, screwing or adhesive connection. The window assembly 25 bears against a bearing surface 29 of the window frame 24, which bearing surface is conical, i.e. positioned slightly obliquely. The window assembly 25 comprises an inner pane 30 and an outer pane 31 which runs at a distance parallel thereto, said panes being enclosed by an encircling seal 32. The seal 32 has an encircling recess 33 with which the window assembly 25 bears against a window frame inner edge 34.

A covering 35 and, overlapping therewith, an encircling covering tape 36 are arranged on the outer pane 31 of the window assembly 25 in order to ensure complete protection of the window element 24 against the paint or the spray mist during the painting operation. A first section 37 of the covering tape 36 in turn rests in an overlapping manner on the covering 35, which essentially entirely covers the outer pane 31, while a second section 38 of the covering tape 36, angled at 90° with respect to the first section 37, runs between the window frame inner edge 34 and the recess 33. Otherwise, the arrangement and the position of the covering 35 and of the covering tape 36 corresponds to the arrangement already explained within the context of the description of FIG. 2.

For the covering 35, use is again made of a self-adhesive plastic film which can be detached without leaving a residue. The covering tape 36 is likewise formed by a self-adhesive, tape-shaped plastic film which can be detached from the underlying surface without leaving a residue. Both plastic films preferably includes a thermoplastic material without a fiber reinforcement.

LIST OF REFERENCE NUMBERS

1 Window element
2 Window cutout
3 Skin (fuselage)
4 Window frame
5 Window assembly
6 Edge region
7 Covering tape
8 Covering layer
8*a* Border area
9 Inner pane
10 Outer pane
10*a* Border area
11 Sealing profile
11*a* Recess for inner window
11*b* Recess for outer window
11*c* Outmost part of inclined surface 11*d* of sealing profile
11*d* Inclined surface of sealing profile
11*e* Rear part of inclined surface of sealing profile 11
12 Recess
13 Window frame inner edge
14 Bearing surface
14*a* Outmost part of inclined surface 14*b*
14*b* Inclined surface
14*d* Rear part of inclined surface
15 Retainer
16 Fastening element
17 Eye bolt
18 Fastening bolt
19 Overlapping region
20 First section (covering tape)
21 Second section (covering tape)
22 Window frame outer side
23 Window element
24 Window frame
25 Window assembly
26 Retainer
27 Fastening element
28 Skin (fuselage)
29 Bearing surface
29*a* Outmost part of inclined surface 29*b* of bearing surface 29
29*b* Inclined surface of bearing surface 29
29*d* Rear part of inclined surface of bearing surface 29
30 Inner pane
31 Outer pane
32 Sealing profile
32*a* Outmost part of inclined surface 32*b*
32*b* Inclined surface
32*d* Rear part of inclined surface
33 Recess
34 Window frame inner edge
35 Covering layer
36 Covering tape
37 First section (covering tape)
38 Second section (covering tape)

The invention claimed is:

1. A window element masked for painting, comprising:
a window frame connectable to a window cutout in a structural part;
a retainer;
a window assembly, having an inner pane, an outer pane, and an encircling sealing profile, positionable between the retainer and the window frame;
fastening elements structured and arranged to clamp the window assembly on the window frame;
the sealing profile having an outer inclined surface and the window frame having an inner inclined surface abutting the outer inclined surface, such that the outer inclined surface and the inner inclined surface are arranged to self-center the window assembly in the window frame;
a covering layer structured and arranged to at least partly cover the outer pane; and
an encircling covering tape comprising a first section that covers a border area of the covering layer and a second section that is at least sectionally positioned between the outer inclined surface of the seal profile and the inner inclined surface of the window frame.

2. The window element according to claim 1, wherein the outer inclined surface of the seal profile has a concave surface and the inner inclined surface of the window frame has a convex surface.

3. The window element according to claim 2, wherein the outer inclined surface of the seal profile and the inner inclined surface of the window frame have an ellipsoid form in cross-sections of the seal profile of the window frame.

4. The window element according to claim 1, further comprising an encircling recess structured and arranged to self-center the window, wherein the encircling recess is formed in the outer inclined surface of the seal profile and the inner inclined surface of the window frame.

5. The window element according to claim 1, wherein the retainer is structured and arranged to clamp the window assembly on the window frame via the fastening elements.

6. The window element according to claim 1, wherein the window frame has one of an L-shaped or T-shaped cross-sectional geometry.

7. The window element according to claim 1, wherein the cross-section of the window frame has an inwardly extending section on an inner end thereof.

8. The window element according to claim 1, wherein the covering layer is placed on the outer pane so that a border area of the surface of the outer pane is left free.

9. The window element according to claim 8, wherein the covering layer and the covering tape overlap each other at least in some regions in the border area of the surface of the outer pane.

10. The window element according to claim 1, wherein the covering layer is structured and arranged to completely cover the outer pane.

11. The window element according to claim 1, wherein the covering tape has a high shearing strength to allow it to be pulled out without leaving a residue.

12. The window element according to claim 1, wherein the covering layer is a self-adhesive plastic film that is detachable without leaving a residue.

13. The window element according to claim 1, wherein the covering tape is a self-adhesive plastic tape that is detachable without leaving a residue.

14. The window element according to claim 1, wherein the covering tape and the covering layer are formed by a thermoplastic material.

15. A method of integrating the window element according to claim 1 in a structural part, comprising:
   inserting the window element in an opening of a structural part;
   painting at least a part of the structural part; and
   removing the covering tape and the covering layer.

16. The method according to claim 15, wherein the covering layer is removed prior to removing the covering tape.

17. The method according to claim 15, wherein the covering tape is removed prior to removing the covering layer.

* * * * *